US012764563B2

(12) United States Patent
Miao et al.

(10) Patent No.: US 12,764,563 B2
(45) Date of Patent: Oct. 13, 2026

(54) METHOD AND APPARATUS FOR CONTROLLING DATA TRANSMISSION, AND STORAGE MEDIUM

(71) Applicant: Datang Mobile Communications Equipment Co., Ltd., Beijing (CN)

(72) Inventors: Jinhua Miao, Beijing (CN); Jing Fu, Beijing (CN); Chandrika Kumudinie Worrall, Beijing (CN); Erlin Zeng, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 443 days.

(21) Appl. No.: 18/249,972

(22) PCT Filed: Oct. 13, 2021

(86) PCT No.: PCT/CN2021/123598
§ 371 (c)(1),
(2) Date: Apr. 21, 2023

(87) PCT Pub. No.: WO2022/083484
PCT Pub. Date: Apr. 28, 2022

(65) Prior Publication Data

US 2023/0397020 A1 Dec. 7, 2023

(30) Foreign Application Priority Data

Oct. 21, 2020 (CN) ......................... 202011131524.6

(51) Int. Cl.
*H04W 24/02* (2009.01)
*H04W 76/19* (2018.01)
*H04W 76/27* (2018.01)

(52) U.S. Cl.
CPC ........... *H04W 24/02* (2013.01); *H04W 76/19* (2018.02); *H04W 76/27* (2018.02)

(58) Field of Classification Search
CPC ..... H04W 24/02; H04W 76/19; H04W 76/27; H04W 72/21; H04W 72/115; H04W 76/28
See application file for complete search history.

(56) References Cited

U.S. PATENT DOCUMENTS

2014/0038622 A1 2/2014 Zhu et al.
2019/0150177 A1 5/2019 Chen et al.
(Continued)

FOREIGN PATENT DOCUMENTS

CN 103763748 A 4/2014
CN 107371264 A 11/2017
(Continued)

OTHER PUBLICATIONS

Andres-Maldonado et al., "Reduced M2M Signaling Communications in 3GPP LTE and Future 5G Cellular Networks", 2016 Wireless Days (Year: 2016).*
(Continued)

*Primary Examiner* — Andrew W Chriss
(74) *Attorney, Agent, or Firm* — KILPATRICK TOWNSEND & STOCKTON LLP

(57) ABSTRACT

The present application provides a method and an apparatus for controlling data transmission, and a storage medium. The method includes: receiving, by a terminal, configuration information of SDT from a network device; when a terminal is in an idle state or an inactive state, if the terminal determines that first data is to be sent, and that the configuration information of the SDT does not meet a transmission requirement of the first data, sending first information to the network device, where the first information is used to
(Continued)

indicate that there exists the first data to be sent at the terminal, and to inform the network device that there exists the first data to be sent at the terminal whose transmission requirement does not match the configuration information of the SDT.

16 Claims, 6 Drawing Sheets

(56) References Cited

U.S. PATENT DOCUMENTS

| | | | | |
|---|---|---|---|---|
| 2019/0215302 | A1* | 7/2019 | Chandramouli | H04L 12/66 |
| 2019/0306764 | A1* | 10/2019 | da Silva | H04W 12/106 |
| 2021/0274525 | A1* | 9/2021 | Wei | H04W 76/27 |
| 2021/0337625 | A1* | 10/2021 | Tsai | H04W 72/23 |
| 2022/0022247 | A1* | 1/2022 | Agiwal | H04W 72/0453 |
| 2022/0210868 | A1* | 6/2022 | Park | H04W 76/27 |
| 2023/0141487 | A1* | 5/2023 | Chin | H04W 52/0235 370/328 |
| 2023/0180223 | A1* | 6/2023 | Tseng | H04W 56/001 370/329 |
| 2023/0262688 | A1* | 8/2023 | Kiilerich Pratas | H04W 72/1268 370/329 |
| 2023/0284329 | A1* | 9/2023 | Agiwal | H04W 76/27 370/331 |

FOREIGN PATENT DOCUMENTS

| | | | |
|---|---|---|---|
| CN | 109936878 | A | 6/2019 |
| CN | 111278088 | A | 6/2020 |
| CN | 111757556 | A | 10/2020 |
| WO | 2020092126 | A1 | 5/2020 |

OTHER PUBLICATIONS

International Search Report and Written Opinion received in the corresponding International Application PCT/CN2021/123598, mailed Jan. 14, 2022.

European Patent Office, Extended European Search Report Issued in Application No. 21881902.7, Jul. 17, 2024, Germany, 10 pages.

Qualcomm Incorporated,“Small data transmission in inactive state”,3GPP TSG-RAN WG3 NR Ad Hoc Meeting, Spokane, Washington, USA, Jan. 17-19, 2017, total 4 pages, R3-170158.

Oppo,“The Conditions for Small Data Transmission in Inactive State”,3GPP TSG-RAN WG2 #111-e, E-meeting, Aug. 2020, total 2 pages, R2-2006837.

* cited by examiner

METHOD AND APPARATUS FOR CONTROLLING DATA TRANSMISSION, AND STORAGE MEDIUM

CROSS-REFERENCE TO RELATED APPLICATIONS

This application is a National Stage of International Application No. PCT/CN2021/123598, filed on Oct. 13, 2021, which claims the priority to Chinese patent application No. 202011131524.6 titled "METHOD AND APPARATUS FOR CONTROLLING DATA TRANSMISSION AND STORAGE MEDIUM" and filed with the China National Intellectual Property Administration on Oct. 21, 2020. The entire contents of the above applications are incorporated into this application by reference in their entireties.

FIELD

The present application relates to the field of communication technologies, and in particular to a method and an apparatus for controlling data transmission, and a storage medium.

BACKGROUND

In a communication system, a terminal may be in any of the following states: an idle state, an inactive state, and a connected state. When the terminal is in the connected state, the terminal may perform data transmission with a network device. When the terminal is in the idle state or the inactive state, the terminal generally does not perform data transmission with the network side. However, in a case, in order to reduce a delay of data transmission, when the terminal is in the idle state or the inactive state, the terminal is allowed to perform small data transmission (SDT) with the network device. The small data transmission indicates that when a data volume of data to be transmitted is less than a threshold, or the number of packets of data to be transmitted is less than a number, the terminal can remain in the idle state or inactive state and perform transmission of the data to be transmitted between the terminal and the network side without entering the connected state.

However, if other data that does not meet the small data transmission conditions needs to be transmitted during the small data transmission between the terminal and the network side, no relevant solution is available currently.

SUMMARY

The present application provides a method and an apparatus for controlling data transmission, and a storage medium, which are used to provide a solution for a case where there exists other data at the terminal which needs to be transmitted but does not meet a small data transmission condition and to ensure timely transmission of the data.

In one embodiment of the present application provides a method for controlling data transmission, including:

receiving, by a terminal, configuration information of SDT from a network device; and when the terminal is in an idle state or an inactive state, if the terminal determines that first data is to be sent, and that the configuration information of the SDT does not meet a transmission requirement of the first data, sending, by the terminal, first information to the network device, where the first information is used to indicate that there exists the first data to be sent at the terminal.

In an implementation, after the sending, by the terminal, the first information to the network device, the method further includes:

receiving, by the terminal, second information from the network device, where the second information is used to instruct the terminal to enter a connected state; and entering, by the terminal, the connected state according to the second information.

In an implementation, the determining, by the terminal, that the configuration information of the SDT does not meet the transmission requirement of the first data includes:

determining, by the terminal, according to configuration information of a bearer of the SDT, that a bearer of the first data is not the bearer of the SDT; or, determining, by the terminal, according to configuration information of a bearer of the SDT, that a data volume of the first data is greater than or equal to a preset data volume; or, determining, by the terminal, according to configuration information of a bearer of the SDT, that a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, a radio resource control (RRC) establishment request, where the RRC establishment request is used to request establishment of an RRC connection; or, an RRC recovery request, where the RRC recovery request is used to request recovery of an RRC connection; or, an identifier of a bearer of the first data.

In an implementation, before sending, by the terminal, the buffer status report to the network device, the method further includes:

receiving, by the terminal, configuration information of the buffer status report from the network device;

where the sending, by the terminal, the buffer status report to the network device includes:

sending, by the terminal, the buffer status report to the network device according to the configuration information of the buffer status report.

In an implementation, the configuration information of the SDT further includes logical channel information of the SDT, where the logical channel information of the SDT includes priority of a logical channel of the SDT; and sending, by the terminal, the buffer status report to the network device includes:

if priority of a logical channel corresponding to the first data is higher than the priority of the logical channel of the SDT, sending, by the terminal, the buffer status report to the network device.

In an implementation, sending, by the terminal, the buffer status report to the network device includes:

if there is no uplink resource available for sending the buffer status report, initiating, by the terminal, random access, and sending the buffer status report to the network device during a random access procedure.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause;

the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the method further includes:

if the terminal does not receive the second information from the network device, entering, by the terminal, the connected state, or sending, by the terminal, the first information again.

In an implementation, the method further includes:

after the sending, by the terminal, the first information to the network device, starting timing;

where that the terminal does not receive the second information from the network device includes:

when timing duration is greater than or equal to preset duration, the terminal still does not receive the second information from the network device.

In an implementation, the method further includes:

if the terminal does not receive the second information from the network device, determining, by the terminal, that SDT transmission fails, or that RRC connection establishment fails, or that RRC connection recovery fails.

In an implementation, before the terminal enters the connected state, the first data is not allowed to be multiplexed on an uplink resource of the SDT, where the configuration information of the SDT further includes uplink resource information of the SDT.

In one embodiment of the present application provides a method for controlling data transmission, including:

sending, by a network device, configuration information of SDT to a terminal; and when the terminal is in an idle state or an inactive state, receiving first information which is sent by the terminal when the terminal determines that first data is to be sent and that the configuration information of the SDT does not meet a transmission requirement of the first data, where the first information is used to indicate that there exists the first data to be sent at the terminal.

In an implementation, after receiving, by the network device, the first information from the terminal, the method further includes:

sending, by the network device, second information to the terminal, where the second information is used to instruct the terminal to enter a connected state.

In an implementation, that the configuration information of the SDT does not meet the transmission requirement of the first data includes:

a bearer of the first data is not a bearer of the SDT; or, a data volume of the first data is greater than or equal to a preset data volume; or, a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of a bearer of the first data.

In an implementation, before receiving, by the network device, the buffer status report from the terminal, the method further includes:

sending, by the network device, configuration information of the buffer status report to the terminal;

where the receiving, by the network device, the buffer status report from the terminal includes:

receiving, by the network device, the buffer status report from the terminal according to the configuration information of the buffer status report.

In an implementation, the configuration information of the SDT further includes logical channel information of the SDT, where the logical channel information of the SDT includes priority of a logical channel of the SDT; and receiving, by the network device, the buffer status report from the terminal includes:

if priority of a logical channel corresponding to the first data is higher than the priority of the logical channel of the SDT, receiving, by the network device, the buffer status report from the terminal.

In an implementation, receiving, by the network device, the buffer status report from the terminal includes:

if there is no uplink resource available for sending the buffer status report, receiving, by the network device, the buffer status report from the terminal during a random access procedure initiated by the terminal.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the method further includes:

if the network device does not send the second information to the terminal, receiving, by the network device, the first information from the terminal again.

In one embodiment of the present application provides an apparatus for controlling data transmission, including a memory, a transceiver, and a processor:

where the memory is configured to store a computer program;

the transceiver is configured to send and receive data under control of the processor;

the processor is configured to read the computer program in the memory and execute following operations:

receiving configuration information of SDT from a network device; and when a terminal is in an idle state or an inactive state, if it is determined that first data is to be sent, and that the configuration information of the SDT does not meet a transmission requirement of the first data, sending first information to the network device, where the first information is used to indicate that there exists the first data to be sent at the terminal.

In an implementation, the processor further performs the following operations:

after the sending the first information to the network device, receiving second information from the network device, where the second information is used to instruct the terminal to enter a connected state; and controlling the terminal to enter the connected state according to the second information.

In an implementation, determining that the configuration information of the SDT does not meet the transmission requirement for the first data includes:

determining, according to configuration information of a bearer of the SDT, that a bearer of the first data is not the bearer of the SDT; or, determining, according to configuration information of a bearer of the SDT, that a data volume of the first data is greater than or equal to a preset data volume; or, determining, according to configuration information of a bearer of the SDT, that a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of a bearer of the first data.

In an implementation, the processor further performs the following operations:

before sending the buffer status report to the network device, receiving configuration information of the buffer status report from the network device;

where the sending the buffer status report to the network device includes:

sending the buffer status report to the network device according to the configuration information of the buffer status report.

In an implementation, the configuration information of the SDT further includes logical channel information of the SDT, where the logical channel information of the SDT includes priority of a logical channel of the SDT; and where sending the buffer status report to the network device includes:

if priority of a logical channel corresponding to the first data is higher than the priority of the logical channel of the SDT, sending the buffer status report to the network device.

In an implementation, sending the buffer status report to the network device includes:

if there is no uplink resource available for sending the buffer status report, initiating random access, and sending the buffer status report to the network device during a random access procedure.

In an implementation, the buffer status report is included in a Msg3 message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processor further performs the following operations:

if the second information is not received from the network device, controlling the terminal to enter the connected state, or sending the first information again.

In an implementation, the processor further performs the following operations:

after the sending the first information to the network device, starting timing;

where that the second information is not received from the network device includes:

when timing duration is greater than or equal to preset duration, the second information is still not received from the network device.

In an implementation, the processor further performs the following operations:

if the second information is not received from the network device, determining that SDT transmission fails, or that RRC connection establishment fails, or that RRC connection recovery fails.

In an implementation, before the terminal enters the connected state, the first data is not allowed to be multiplexed on an uplink resource of the SDT, where the configuration information of the SDT further includes uplink resource information of the SDT.

In one embodiment of the present application provides an apparatus for controlling data transmission, including a memory, a transceiver, and a processor:

where the memory is configured to store a computer program;

the transceiver is configured to send and receive data under control of the processor;

the processor is configured to read the computer program in the memory and execute following operations:

sending configuration information of SDT to a terminal; and when the terminal is in an idle state or an inactive state, receiving first information which is sent by the terminal when the terminal determines that first data is to be sent and that the configuration information of the SDT does not meet a transmission requirement of the first data, where the first information is used to indicate that there exists the first data to be sent at the terminal.

In an implementation, the processor further performs the following operations:

after receiving the first information from the terminal, sending second information to the terminal, where the second information is used to instruct the terminal to enter a connected state.

In an implementation, that the configuration information of the SDT does not meet the transmission requirement of the first data includes:

a bearer of the first data is not a bearer of the SDT; or, a data volume of the first data is greater than or equal to a preset data volume; or, a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the processor further performs the following operations:

before receiving the buffer status report from the terminal, sending configuration information of the buffer status report to the terminal;

where the receiving the buffer status report from the terminal includes:

receiving the buffer status report from the terminal according to the configuration information of the buffer status report.

In an implementation, the configuration information of the SDT further includes logical channel information of the SDT, where the logical channel information of the SDT includes priority of a logical channel of the SDT; and receiving the buffer status report from the terminal includes:

if priority of a logical channel corresponding to the first data is higher than the priority of the logical channel of the SDT, receiving the buffer status report from the terminal.

In an implementation, receiving the buffer status report from the terminal includes:

if there is no uplink resource available for sending the buffer status report, receiving the buffer status report from the terminal during a random access procedure initiated by the terminal.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processor further performs the following operations:

if the second information is not sent to the terminal, receiving the first information from the terminal again.

In one embodiment of the present application provides an apparatus for controlling data transmission, including:

a receiving device, configured to receive configuration information of SDT from a network device;

a processing device, configured to determine whether first data is to be sent, and the configuration information of the SDT does not meet a transmission requirement of the first data; and a sending device, configured to, when the terminal is in an idle state or an inactive state and if the processing device determines that the first data is to be sent and that the configuration information of the SDT does not meet the transmission requirement of the first data, send first information to the network device, where the first information is used to indicate that there exists the first data to be sent at the terminal.

In an implementation, the receiving device is further configured to, after the sending device sends the first information to the network device, receive second information from the network device, where the second information is used to instruct the terminal to enter a connected state; and the processing device is further configured to control the terminal to enter the connected state according to the second information.

In an implementation, the determining that the configuration information of the SDT does not meet the transmission requirement of the first data includes:

determining, according to configuration information of a bearer of the SDT, that a bearer of the first data is not the bearer of the SDT; or, determining, according to configuration information of a bearer of the SDT, that a data volume of the first data is greater than or equal to a preset data volume; or, determining, according to configuration information of a bearer of the SDT, that a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the receiving device is further configured to, before the sending device sends the buffer status report to the network device, receive configuration information of the buffer status report from the network device;

where the sending the buffer status report to the network device includes:

sending the buffer status report to the network device according to the configuration information of the buffer status report.

In an implementation, the configuration information of the SDT further includes logical channel information of the SDT, where the logical channel information of the SDT includes priority of a logical channel of the SDT; and where sending the buffer status report to the network device includes:

if priority of a logical channel corresponding to the first data is higher than the priority of the logical channel of the SDT, sending the buffer status report to the network device.

In an implementation, sending the buffer status report to the network device includes:

if there is no uplink resource available for sending the buffer status report, initiating random access, and sending the buffer status report to the network device during a random access procedure.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processing device is further configured to, if the receiving device does not receive the second information from the network device, enter the connected state; or, the sending device is further configured to, if the receiving device does not receive the second information from the network device, send the first information again.

In an implementation, the processing device is further configured to, after the first information is sent to the network device, start timing;

where that the second information is not received from the network device includes:

when timing duration is greater than or equal to preset duration, the second information is still not received from the network device.

In an implementation, the processing device is further configured to, if the receiving device does not receive the second information from the network device, determine that SDT transmission fails, or that RRC connection establishment fails, or that RRC connection recovery fails.

In an implementation, before the terminal enters the connected state, the first data is not allowed to be multiplexed on an uplink resource of the SDT, where the configuration information of the SDT further includes uplink resource information of the SDT.

In one embodiment of the present application provides an apparatus for controlling data transmission, including:

a sending device, configured to send configuration information of SDT to a terminal; and a receiving device, configured to, when the terminal is in an idle state or an inactive state, receive first information which is sent by the terminal when the terminal determines that first data is to be sent and that the configuration information of the SDT does not meet a transmission requirement of the first data, where the first information is used to indicate that there exists the first data to be sent at the terminal.

In an implementation, the sending device is further configured to, after the receiving device receives the first information from the terminal, send second information to the terminal, where the second information is used to instruct the terminal to enter a connected state.

In an implementation, that the configuration information of the SDT does not meet the transmission requirement of the first data includes:

a bearer of the first data is not a bearer of the SDT; or, a data volume of the first data is greater than or equal to a preset data volume; or, a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the sending device is further configured to, before the receiving device receives the buffer status report from the terminal, send configuration information of the buffer status report to the terminal;

where the receiving the buffer status report from the terminal includes:

receiving the buffer status report from the terminal according to the configuration information of the buffer status report.

In an implementation, the configuration information of the SDT further includes logical channel information of the SDT, where the logical channel information of the SDT includes priority of a logical channel of the SDT; and the receiving the buffer status report from the terminal includes:

when priority of a logical channel corresponding to the first data is higher than the priority of the logical channel of the SDT, receiving the buffer status report from the terminal.

In an implementation, the receiving the buffer status report from the terminal includes:

if there is no uplink resource available for sending the buffer status report, receiving the buffer status report from the terminal during a random access procedure initiated by the terminal.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the receiving device is further configured to, if the sending device does not send the second information to the terminal, receive the first information from the terminal again.

In one embodiment of the present application provides a processor-readable storage medium, where the processor-readable storage medium has a computer program stored thereon, and the computer program is used to cause a processor to execute the method according to the method of the embodiments of the disclosure or the method of the embodiments.

In one embodiment of the present application provides a computer program product including instructions, where when the instructions run on a computer, the computer is caused to execute the method of the embodiments of the disclosure or the method of the another embodiment of the disclosure.

In one embodiment of the present application provides a system for controlling data transmission, including any network device described above and at least one terminal described above.

The present application provides a method and an apparatus for controlling data transmission, and a storage medium. The method includes: a terminal receives configuration information of SDT from a network device; when the terminal is in an idle state or an inactive state, if the terminal determines that first data is to be sent and that the configuration information of the SDT does not meet a transmission requirement of the first data, the terminal sends first information to the network device, where the first information is used to indicate that there exists the first data to be sent at the terminal, and to inform the network device that there exists the first data to be sent at the terminal whose transmission requirement does not match the configuration information of the SDT, and the network device makes a relevant decision. Therefore, the present application provides a related solution for a case where the configuration information of the SDT at the terminal does not meet the transmission requirement of the first data, and to ensure the timely transmission of the first data.

It should be understood that what is described in the summary above is not intended to limit key or important features of embodiments of the present disclosure, nor is it intended to limit the scope of the present disclosure. Other features of the present disclosure will be easily understood through the following description.

BRIEF DESCRIPTION OF DRAWINGS

In order to describe the embodiments in the present application or prior art more clearly, drawings that need to be used in the description of the embodiments or prior art will be introduced briefly in the following. The drawings described below are some embodiments of the present disclosure.

DESCRIPTION OF EMBODIMENTS

Figure 1:
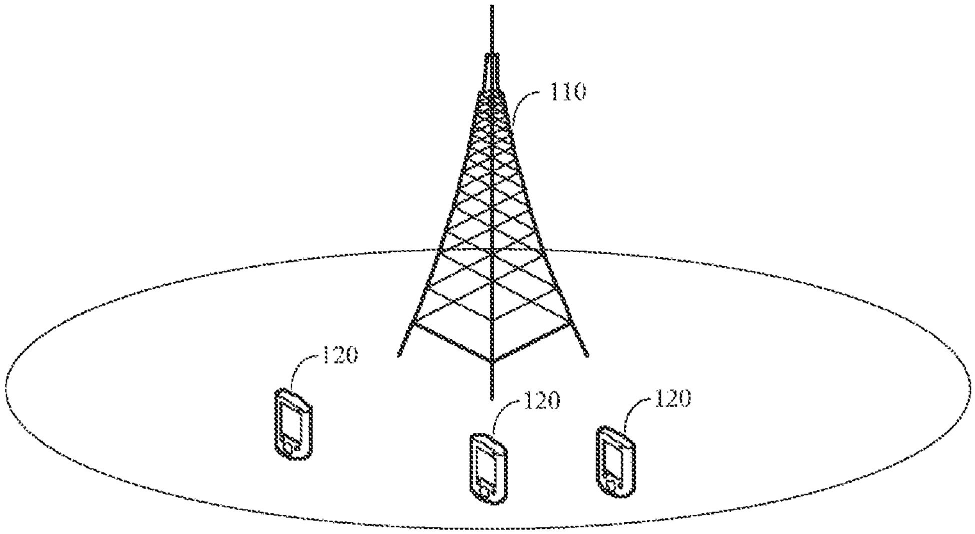
FIG. 1 is a schematic diagram of an application scenario provided by an embodiment of the present application.

The term "and/or" in the present application is an association relationship describing associated objects, and represents that there may be three types of relationships. For example, A and/or B may represent three situations: presence of A only, presence of both A and B, and presence of B only. The character "/" herein generally represents an "or" relationship between contextual objects.

The term "plurality" in the present application refers to two or more than two, and other quantifiers are similar.

The embodiments of the present application will be described as follows clearly and completely in conjunction with accompanying drawings in the embodiments of the present application. Apparently, the described embodiments are merely a part rather than all the embodiments of the present application.

Embodiments of the present application provide a method and an apparatus for controlling data transmission, and a storage medium. A terminal first receives configuration information of SDT from a network device. When the terminal is in an idle state or an inactive state, if the terminal determines that first data is to be sent, and that the configuration information of the SDT does not meet a transmission requirement of the first data, the terminal sends first information to the network device, where the first information is used to indicate that there exists the first data to be sent at the terminal, and to inform the network device that there exists the first data to be sent at the terminal whose transmission requirement does not match the configuration information of the SDT, and the network device makes relevant decisions, for example, the network device instructs the terminal to enter a connected state to enable the terminal to send the first data to the network device as soon as possible. Therefore, the present application provides related solutions for the case where the configuration information of the SDT does not meet the transmission requirement of the first data.

The method and the apparatus are based on the same application concept. Since the method and the apparatus solve the problem with similar principles, reference can be made to each other for the implementation of the apparatus and the method, and the repetition is not repeated.

The embodiments of the present application can be applied to various systems, especially 5G systems. For example, the applied system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems all include terminal and network devices. The system may also include a core network portion, such as an evolved packet system (EPS), a 5G system (5GS), etc.

The terminal involved in the embodiments of the present application may be a device that provides voice and/or data connectivity to a user, a handheld device with a wireless connection function, or other processing devices connected to a wireless modem. The name of the terminal may also vary in different systems. For example, in a 5G system, the terminal may be called a user equipment (UE). A wireless terminal may communicate with one or more core networks (CN) via a radio access network (RAN). The wireless terminal may be a mobile terminal, such as a mobile phone (or "cellular" phone) and a computer with a mobile terminal, for example, a portable, pocket-sized, handheld, computer built-in, or vehicle-mounted mobile device, which exchanges language and/or data with the radio access network. For example, a personal communications service (PCS) phone, a cordless phone, a session initiated protocol (SIP) phone, a wireless local loop (WLL) station, a personal digital assistant (PDA) or other devices. The wireless terminal may also be called a system, a subscriber device, a subscriber station, a mobile station, a mobile, a remote station, an access point, a remote terminal, an access terminal, a user terminal, a user agent, and a user device, which are not limited in the embodiments of the present application.

The network device involved in the embodiments of the present application may be a base station, which may include cells providing services to the terminal. Depending on the application, the base station may also be called an access point, or a device in the access network that communicates with the wireless terminal through one or more sectors on an air interface, or other names. The network device may be used to interchange a received air frame with an Internet protocol (IP) packet, and may act as a router between the wireless terminal and the rest of the access network, where the rest of the access network may include an Internet protocol (IP) communication network. The network device may also coordinate the management of attributes of the air interface. For example, the network device involved in the embodiments of the present application may be a network device (Base Transceiver Station, BTS) in a global system for mobile communications system (GSM) or code division multiple access (CDMA), or a network device (NodeB) in Wide-band Code Division Multiple Access (WCDMA), or an evolutional network device (evolutional Node B, eNB or eNodeB) in a long term evolution (LTE) system, or a 5G base station (gNB) in a 5G network architecture (next generation system), or a home evolved base station (Home evolved Node B, HeNB), or a relay node, a home base station (femto), a pico base station (pico), etc., which are not limited in the embodiments of the present application. In some network structures, the network device may include a centralized unit (CU) node and a distributed unit (DU) node, and the centralized unit and the distributed unit may also be geographically separated.

The network device and the terminal may use one or more antennas respectively for multi input multi output (MIMO) transmission, and the MIMO transmission may be single user MIMO (SU-MIMO) or multiple user MIMO (MU-MIMO). According to the shape and the number of root antenna combinations, the MIMO transmission may be 2D-MIMO, 3D-MIMO, FD-MIMO or massive-MIMO, or may be diversity transmission, pre-coded transmission or beamforming transmission, etc.

FIG. 1 is a schematic diagram of an application scenario of an embodiment of the present application. As shown in FIG. 1, the embodiment provides a communication system 100, which includes a network device 110 and one or more terminals 120, where the embodiment is illustrated by taking three terminals 120 as an example. When the terminal 120 is in an idle state or an inactive state, the terminal 120 and the network device can perform SDT. For example, a user operates a chat tool installed in the terminal 120 to chat with a small amount of text, and at this time, the terminal 120 uses a SDT mode to send data of the above text to the network device 110. If the user operates the chat tool installed in the terminal 120 to chat with a relatively large amount of text, or the user operates the chat tool installed in the terminal 120 to initiate a voice call, or the user operates the chat tool installed in the terminal 120 to initiate a video call, in these scenarios the terminal 120 needs to send a relatively large amount of data to the network device 110, but the SDT mod cannot meet the transmission requirement of the data. In order to solve the problem, the embodiments of the present application can be adopted. Various embodiments are used below to describe the solution in detail.

Figure 2:
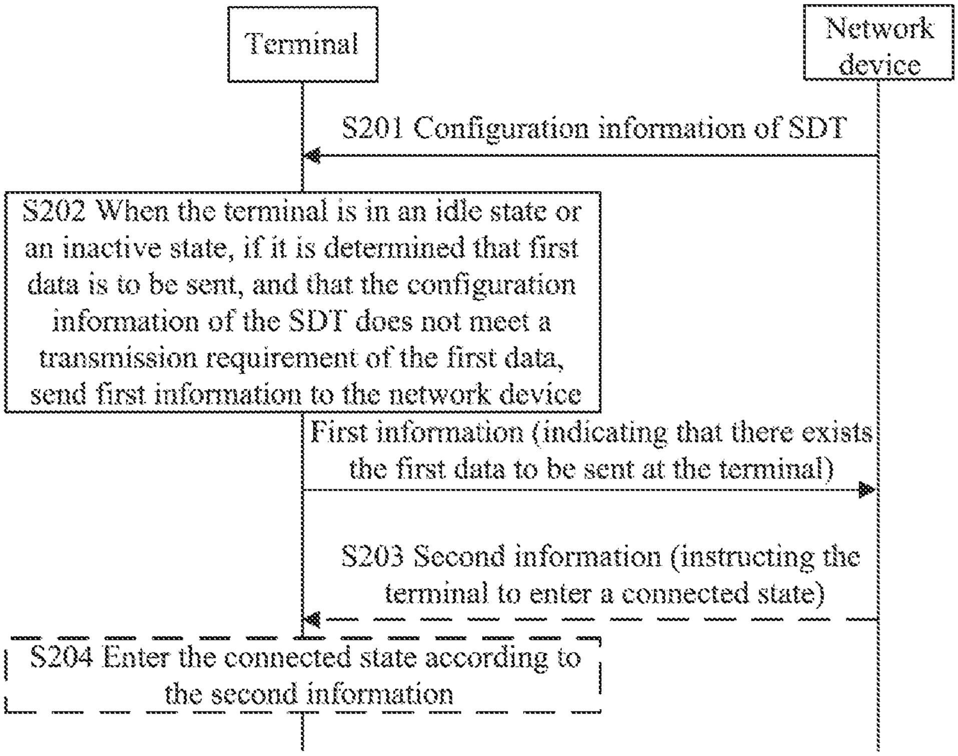
FIG. 2 is a flowchart of a method for controlling data transmission provided by an embodiment of the present application.

FIG. 2 is a flowchart of a method for controlling data transmission provided by an embodiment of the present application. As shown in FIG. 2, the method of the embodiment includes:

S201, a network device sends configuration information of SDT to a terminal. Correspondingly, the terminal receives the configuration information of the SDT from the network device.

In the embodiment, the network device may send an RRC release message to the terminal, and the RRC release message includes the configuration information of the SDT. Correspondingly, the terminal receives the RRC release message sent by the network device to obtain the configuration information of the SDT. The terminal also enters an idle state or an inactive state according to the RRC release message.

The configuration information of the SDT includes one or more of the following: bearer configuration information used by the SDT, resource configuration information of the SDT, initialization configuration information of the SDT.

The bearer configuration used by the SDT is used to indicate configuration information of a bearer of the SDT, such as logical channel information, PDCP configuration information, RLC configuration information.

The resource configuration information of the SDT is used to indicate a location of a resource used by the SDT, such as random access channel (RACH) resource location, physical uplink shared channel (PUSCH) location, period, frequency domain position, etc.

The initialization configuration of the SDT is used to indicate a condition satisfying the SDT, such as the network side indicating that the SDT is supported, a relevant threshold value of data conforming to the SDT; a reference signal receiving power (RSRP) value of the SDT.

In an implementation, the network device may send at least one piece of the following information to the terminal: a frequency domain position of PUSCH, a symbol starting position, a symbol duration length, configuration information of a demodulation reference signal (DM-RS), resource sequence number information.

S202, when the terminal is in an idle state or an inactive state, if the terminal determines that first data is to be sent, and that the configuration information of the SDT does not meet a transmission requirement of the first data, the terminal sends first information to the network device. Correspondingly, the network device receives the first information from the terminal.

In the embodiment, when the terminal is in the idle state or an inactive state, if the terminal determines that there exists data to be sent (for example, there exists data reaching a higher layer), the data to be sent is called the first data. The terminal further determines whether the configuration information of the SDT satisfies the transmission requirement of the first data (such as a requirement on time delay, reliability). If the configuration information of the SDT meets the transmission requirement of the first data, the terminal transmits the first data, that is, sends the first data to the network device according to the configuration information of the SDT. If the configuration information of the SDT does not meet the transmission requirement of the first data, it is indicated that the terminal does not transmit the first data, but the terminal sends the first information to the network device, where the first information is used to indicate that there exists the first data to be sent at the terminal, and to inform the network device that there exists the first data to be sent at the terminal whose transmission requirement does not match the configuration information of the SDT.

Correspondingly, the network device receives the first information sent by the terminal, and determines, according to the first information, that there exists first data to be sent at the terminal, whose transmission requirement does not match the configuration information of the SDT. The network device may make a corresponding decision according to the terminal being in an idle state or an inactive state and to the first information.

In an implementation, the first information may include: a buffer status report (BSR), or an RRC establishment request, or an RRC recovery request, or an identifier of a bearer of the first data.

In the method for controlling data transmission provided in the embodiment, the terminal first receives the configuration information of the SDT from the network device. When the terminal is in an idle state or an inactive state, if the terminal determines that first data is to be sent, and that the configuration information of the SDT does not meet a transmission requirement of the first data, the terminal sends first information to the network device, where the first information is used to indicate that there exists the first data to be sent at the terminal, and to inform the network device that there exists the first data to be sent at the terminal whose transmission requirement does not match the configuration information of the SDT, and the network device makes a relevant decision. Therefore, the present application provides related solutions for the case where the configuration information of the SDT at the terminal does not meet the transmission requirement of the first data.

On the basis of the embodiment illustrated in FIG. 2, the above-mentioned determination by the terminal on whether the configuration information of the SDT satisfies the transmission requirement of the first data may include at least the following implementations:

In a first possible implementation, the terminal determines whether the bearer of the first data is a bearer of the SDT according to the configuration information of the bearer of the SDT. If the bearer of the first data is the bearer of the SDT, it is indicated that the first data is data that needs to be transmitted in the SDT mode, that is, the first data is SDT data, and the terminal determines that the configuration information of the SDT meets the transmission requirement of the first data. If the bearer of the first data is not the bearer of the SDT, it is indicated that the first data is not data to be transmitted in the SDT mode, that is, the first data is non-SDT data, and the terminal determines that the configuration information of the SDT does not meet the transmission requirement of the first data. In an implementation, the configuration information of the SDT in S201 described above includes configuration information of the bearer of the SDT. In an implementation example, the configuration information of the bearer of the SDT may include an identifier of the bearer of the SDT. Therefore, in the embodiment, it may be determined whether the identifier of the bearer of the first data is the same as the identifier of the bear of the SDT. If the identifier of the bearer of the first data is the same as the identifier of the bear of the SDT, it is indicated that the bearer of the first data is the bear of the SDT. If the identifier of the bearer of the first data is different from the identifier of the bear of the SDT, it is indicated that the bearer of the first data is not the bear of the SDT.

For example, the SDT data may be text data transmitted by chat tool software in the terminal. The non-SDT data may be voice data or video data transmitted by the chat tool software in the terminal.

Therefore, in the implementation, a related solution is provided for the case where there exists non-SDT data to be sent when the terminal is in the idle state or the inactive state.

In a second possible implementation, the terminal determines whether a data volume of the first data is less than a preset data volume. If the terminal determines that the data volume of the first data is greater than or equal to the preset data volume, it is indicated that the first data cannot be transmitted in the SDT mode, and the terminal determines that the configuration information of the SDT does not meet the transmission requirement of the first data. In some optional examples, the first data may be SDT data or non-SDT data. The preset data volume may be predefined in the terminal, or the preset data volume may be configured by the network device for the terminal, for example, the preset data volume is included in the above configuration information of the SDT. For example, the preset data volume belongs to the relevant threshold value of data conforming to the SDT.

If the terminal determines that the data volume of the first data is less than the preset data volume, it is indicated that the first data can be transmitted in the SDT mode, and the terminal determines that the configuration information of the SDT meets the transmission requirement of the first data. In one embodiment, the terminal also determines whether the bearer of the first data is the bear of the SDT according to the configuration information of the SDT. For the implementation process, reference may be made to the description in the previous possible implementation, which will not be repeated here. If the bearer of the first data is the bear of the SDT, the terminal determines that the configuration information of the SDT meets the transmission requirement of the first data. If the bearer of the first data is not the bearer of the SDT, the terminal determines that the configuration information of the SDT does not meet the transmission requirement of the first data.

For example, the SDT data is text data transmitted by the chat tool software in the terminal. The first data is also text data transmitted by the chat tool software in the terminal, and the first data may be, for example, a large amount of text data in a chat message.

Therefore, in the implementation, a related solution is provided for the case where there exists a large amount of SDT data or non-SDT data to be sent when the terminal is in the idle state or the inactive state.

In a third possible implementation, the terminal determines whether a number of packets of the first data is less than a preset number. If the terminal determines that the number of packets of the first data is greater than or equal to the preset number, it is indicated that the first data cannot be transmitted in the SDT mode, and the terminal determines that the configuration information of the SDT does not meet the transmission requirement of the first data. In some optional examples, the first data may be SDT data or non-SDT data. The preset number may be predefined in the terminal, or the preset number may be configured by the network device for the terminal, for example, the preset number is included in the above configuration information of the SDT. For example, the preset number belongs to the relevant threshold value of data conforming to the SDT.

If the terminal determines that the number of packets of the first data is less than the preset number, it is indicated that the first data can be transmitted in the SDT mode, and the terminal determines that the configuration information of the SDT meets the transmission requirement of the first data. In one embodiment, the terminal also determines whether the bearer of the first data is the bear of the SDT according to the configuration information of the SDT. For the implementation process, reference can be made to the description in the previous possible implementation, which will not be repeated here. If the bearer of the first data is the bear of the SDT, the terminal determines that the configuration information of the SDT meets the transmission requirement of the first data. If the bearer of the first data is not the bearer of the SDT, the terminal determines that the configuration information of the SDT does not meet the transmission requirement of the first data.

For example, the SDT data is text data transmitted by the chat tool software in the terminal. The first data is also text data transmitted by the chat tool software in the terminal, and the first data may be, for example, consecutive chat messages.

Therefore, in the implementation, a related solution is provided for the case where there exists SDT data with a large number of packets or non-SDT data to be sent when the terminal is in the idle state or the inactive state.

In an optional embodiment, on the basis of the embodiment illustrated in FIG. 2, after performing the above S202, the following may also be included:

S203, the network device sends second information to the terminal. Correspondingly, the terminal receives the second information from the network device.

S204, the terminal enters the connected state according to the second information.

In the embodiment, after the network device receives the first information which is sent by the terminal and which is used to indicate that there exists the first data to be sent at the terminal, in an implementation, the first information may be used for the terminal to request to enter the connected state, and the network device determines that the terminal is allowed to send the first data, that is to say, the network device determines that the terminal is allowed to enter the connected state. The network device then sends the second information to the terminal, where the second information is used to instruct the terminal to enter the connected state.

Correspondingly, the terminal receives the second information sent by the network device, and enters the connected state according to the second information. For example, the terminal establishes an RRC connection according to the second information. Therefore, after the terminal enters the connected state, the success rate of sending the first data can be guaranteed, and the first data can be sent from the terminal to the network device in time.

In an implementation, the above second information may include an RRC establishment message, or an RRC recovery message.

In an optional example, if the terminal does not receive the second information from the network device, the terminal enters the connected state, or the terminal sends the above-mentioned first information again, and the terminal receives the second information from the network device, and then enters the connected state. In an implementation, if the terminal does not receive the second information from the network device, the terminal determines that SDT transmission fails, or that RRC connection establishment fails, or that RRC connection recovery fails. Then, according to what is determined above, the terminal enters the connection state or sends the above-mentioned first information again.

In an implementation, after the terminal performs the above-mentioned sending of the first information to the network device in S202, the terminal starts timing. For example, the terminal starts a timer to start timing. If the terminal receives the second information from the network device when the timing duration is less than preset duration (that is, the timer does not expire), the terminal enters the connected state. If the terminal still does not receive the second information from the network device when the timing duration is greater than or equal to the preset duration (that is, the timer expires), the terminal enters the connected state, and the first data can be sent to the network device in time. The terminal does not receive the second information sent by the network device after sending the first information twice to the network device, and in order to avoid that the second information sent by the network device cannot successfully reach the terminal due to other reasons, the terminal directly enters the connected state, to ensure that the first data can be sent to the network device in time. In one embodiment, if the terminal still does not receive the second information from the network device when the timing duration is greater than or equal to the preset duration (that is, the timer expires), the terminal sends the first information to the network device again and the timer restarts timing, and determines again whether the terminal receives the second information from the network device when the timing duration is smaller than the preset duration. Reference can be made to the above description for the similar process, which will not be repeated here. The procedure continues until the terminal receives the second information sent by the network device to enter the connected state, and the first data can be sent to the network device as soon as possible. The terminal sends the first information to the network device several times at intervals, and to ensure that the terminal enters the connected state after receiving the second information fed back by the network device.

In an optional embodiment, the configuration information of the SDT in S201 above further includes uplink resource information of the SDT. Before the terminal executes the above S204, that is, before the terminal enters the connected state, the first data cannot be multiplexed on an uplink resource of the SDT. That is to say, before the terminal enters the connected state, the terminal buffers the above-mentioned first data. Since in the embodiment, the terminal will not multiplex the uplink resource of the SDT for the transmission of the first data, the transmission performance of the SDT is guaranteed.

In an implementation, the network device further sends third information to the terminal, where the third information is used to indicate that uplink grant mapped to an SDT logical channel is different from uplink grant mapped to a non-SDT logical channel. Correspondingly, the terminal receives the third information sent by the network device.

The third information may be included in the configuration information of the SDT, or, the third information and the configuration information of the SDT are included in the same message which is sent to the terminal by the network device, or, the third information and the configuration information of the SDT are respectively sent to the terminal by the network device through different messages. If the terminal determines that the bearer of the first data is not the bearer of SDT, that is, the first data is non-SDT, then according to the third information, the terminal will not multiplex the uplink resource of the SDT for the transmission of the first data, but buffer the first data.

In an optional embodiment, after the terminal executes the above S204, that is, after the terminal enters the connected state, when the terminal is in the connected state, the terminal sends the above first data to the network device. In the embodiment, before entering the connection state, the terminal temporarily does not send the first data to the network device, but sends the first data to the network device after the terminal enters the connection state to ensure the success rate of sending the first data.

The present application is described below using several implementations, where the network device may be a base station, and the terminal may be a UE.

Figure 3:
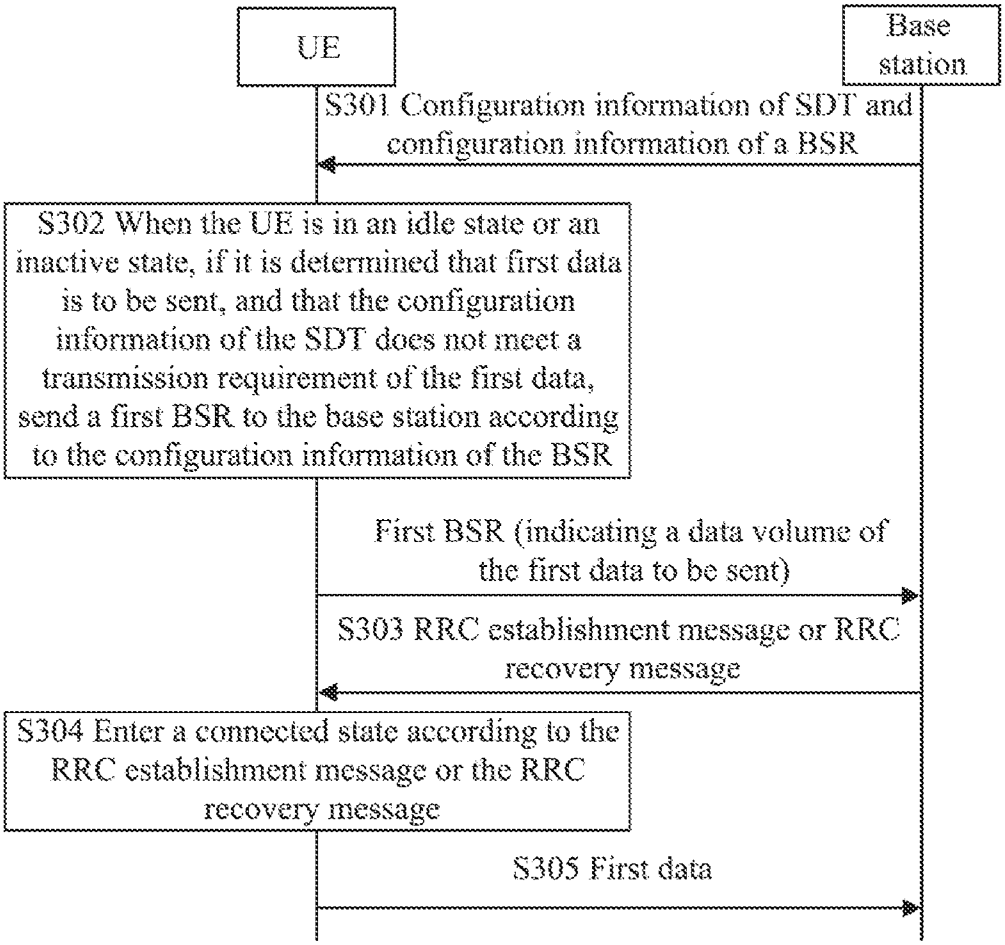
FIG. 3 is a flowchart of a method for controlling data transmission provided by another embodiment of the present application.

FIG. 3 is a flowchart of a method for controlling data transmission provided by another embodiment of the present application. As shown in FIG. 3, first information in the embodiment includes a BSR, and second information includes an RRC establishment message or an RRC recovery message. The method of the embodiment may include:

S301, a base station sends configuration information of SDT and configuration information of a BSR to a UE. Correspondingly, the UE receives the configuration information of the SDT and the configuration information of the BSR from the base station.

In the embodiment, for the configuration information of the SDT, reference can be made to the relevant description of S201 above, which will not be repeated here.

The configuration information of the BSR may be included in the configuration information of the SDT, or the configuration information of the BSR and the configuration information of the SDT may be included in the same message to be sent from the base station to the UE, or the configuration information of the BSR and the configuration information of the SDT are respectively sent from the base station to the UE through different messages.

In a possible implementation, the base station sends an RRC release message to the UE, where the RRC release message includes the configuration information of the SDT and the configuration information of the BSR.

S302, when the UE is in an idle state or an inactive state, if the UE determines that first data is to be sent, and that the configuration information of the SDT does not meet a transmission requirement of the first data, the UE sends a first BSR to the base station according to the configuration information of the BSR. Correspondingly, the base station receives the first BSR from the UE according to the configuration information of the BSR.

In the embodiment, when the UE is in the idle state or the inactive state, the UE determines that the first data is to be sent, and that the configuration information of the SDT does not meet the transmission requirement of the first data. For the implementation process, reference can be made to the relevant description of S202 above, which will not be repeated here. Then, the UE sends the BSR to the base station, where the BSR is used to indicate a data volume of the first data to be sent, that is, the BSR represents or indicates that there exists the first data to be sent at the UE.

The configuration information of the BSR includes reporting configuration information of the BSR, where the reporting configuration information of the BSR includes a reporting format of the BSR.

The configuration information of the BSR includes configuration information of the BSR corresponding to the SDT data and configuration information of the BSR corresponding to the non-SDT data. The UE sends the BSR to the base station according to the configuration information of the BSR corresponding to the first data, which may be referred to as a first BSR, where the first BSR indicates the data volume of the first data to be sent. If the first data is SDT data, the UE sends the first BSR to the base station according to the configuration information of the BSR corresponding to the SDT data. If the first data is non-SDT data, the UE sends the first BSR to the base station according to the configuration information of the BSR corresponding to the non-SDT data.

In an optional implementation, the above configuration information of the SDT also includes logical channel information of the SDT. The logical channel information of the SDT includes priority of a logical channel of the SDT, and the priority of the logical channel can be represented by a priority identifier. If the first data is non-SDT data, the UE also determines whether the priority of the logical channel corresponding to the first data is higher than the priority of the logical channel of the SDT. If the UE determines that the priority of the logical channel corresponding to the first data is higher than the priority of the logical channel of the SDT, the UE sends the first BSR to the base station, and the UE requests, through the first BSR, to enter the connected state to acquire a UL resource on which the first data can be transmitted, to facilitate the transmission of the first data. If the UE determines that the priority of the logical channel corresponding to the first data is not higher than the priority of the logical channel of the SDT, the UE does not trigger the sending of the first BSR to the base station.

In an implementation, the logical channel information further includes: logical channel group information corresponding to the logical channel, and a corresponding data size of the logical channel group. In a possible implementation, if the UE determines that the priority of the logical channel group, to which the logical channel corresponding to the first data belongs, is higher than the priority of the logical channel group, to which the logical channel of the SDT belongs, the UE sends the first BSR to the base station.

In a possible implementation, the UE further determines whether there exists an uplink resource available for sending the first BSR, and if there exists an uplink resource available for sending the first BSR, the UE sends the first BSR to the base station via the uplink resource. If there exists no uplink resource available for sending the first BSR, the UE initiates random access, and sends the first BSR to the base station during a random access procedure, and to ensure that the UE can send the first BSR to the base station as soon as possible. In an implementation, when the UE initiates a random access procedure, the first BSR is included in a Msg3 or MSGA (also referred to as MsgA) message sent by the UE to the base station. Therefore, the implementation increases chance of sending the first BSR to the base station when the UE is in the idle state or the inactive state, and improves the success rate of the UE requesting to enter the connected state.

S303, the base station sends an RRC establishment message or an RRC recovery message to the UE. Correspondingly, the UE receives the RRC establishment message or the RRC recovery message from the base station.

In the embodiment, after the base station receives the first BSR sent by the UE, the base station allows the UE to enter the connected state, and then the base station sends an RRC establishment message or an RRC recovery message to the UE. For example, if the UE is currently in the idle state, the base station sends an RRC establishment message to the UE, and if the UE is currently in the inactive state, the base station sends an RRC recovery message to the UE.

S304, the UE enters the connected state according to the RRC establishment message or the RRC recovery message.

In the embodiment, if the UE receives the RRC establishment message sent by the base station, where the RRC establishment message is used to instruct the UE to establish an RRC connection, the UE establishes the RRC connection according to the RRC establishment message, and to enter the connected state. For example, the UE enters the connected state from the idle state according to the RRC establishment message.

If the UE receives the RRC recovery message sent by the base station, where the RRC recovery message is used to instruct the UE to recover the RRC connection, the UE recovers the RRC connection according to the RRC recovery message, and to enter the connected state. For example, the UE enters the connected state from the inactive state according to the RRC recovery message.

In an implementation, if the UE does not receive the RRC establishment message or the RRC recovery message sent by the base station, reference can be made to related descriptions in the foregoing embodiment for a related operation of the UE, which will not be repeated here.

In an implementation, after the UE sends the first BSR to the base station, the UE starts a timer to start timing, and that the UE does not receive the RRC establishment message or the RRC recovery message sent by the base station refers to that when timing duration is greater than or equal to preset duration, the UE still does not receive the RRC establishment message or the RRC recovery message from the base station.

S305, the UE sends the first data to the base station.

In the embodiment, after the UE enters the connected state, the UE may send the first data to the base station.

In the method for controlling data transmission provided by the embodiment, when the UE is in the idle state or inactive state, if the UE determines that the first data is to be sent, and that the configuration information of the SDT does not meet the transmission requirement of the first data, the UE sends the first BSR to the base station, where the first BSR is used to inform the base station that there exists the first data to be sent, the transmission requirement of which is not met by the configuration information of the SDT, and the base station makes relevant decisions, for example, the base station sends an RRC establishment message or an RRC recovery message to the UE, to make the UE enter the connected state, and to send the first data in the connected state, to improve the transmission success rate and reliability of the first data.

Figure 4:
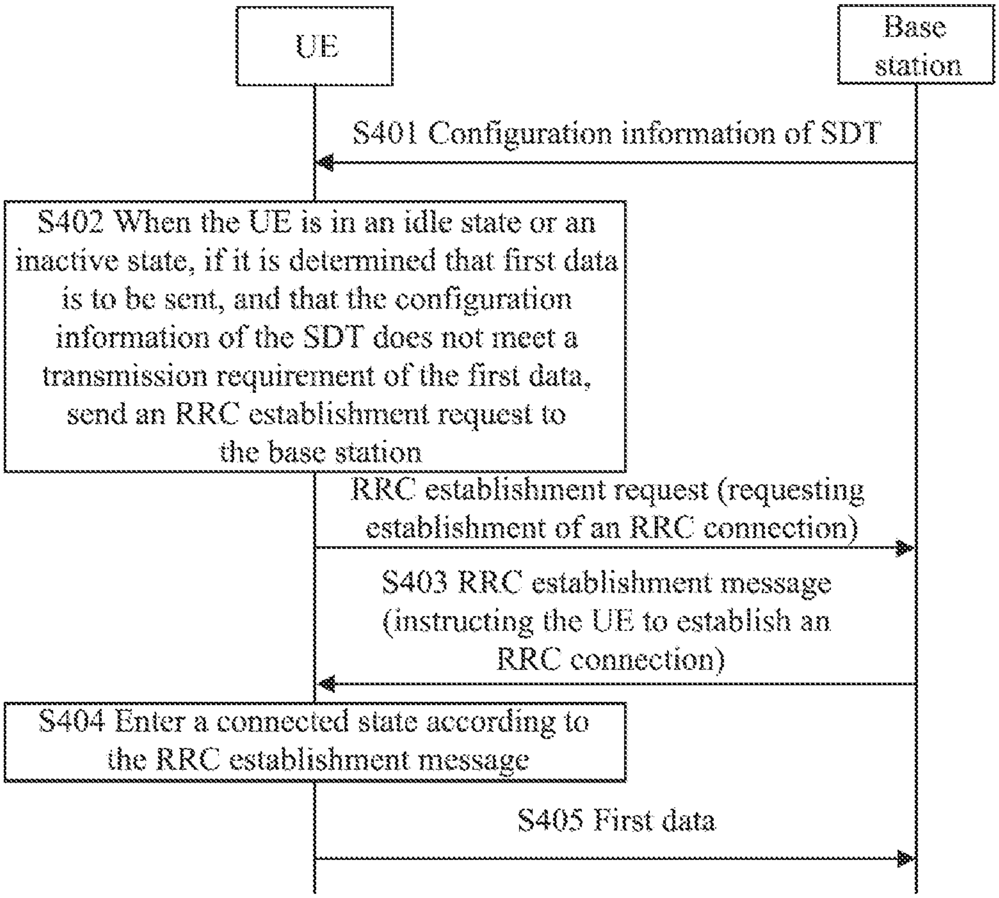
FIG. 4 is a flowchart of a method for controlling data transmission provided by another embodiment of the present application.

FIG. 4 is a flowchart of a method for controlling data transmission provided by another embodiment of the present application. As shown in FIG. 4, first information in the embodiment includes an RRC establishment request, and second information includes an RRC establishment message. The method of the embodiment may include:

S401, a base station sends configuration information of SDT to a UE.

In the embodiment, for the implementation process of S401, reference can be made to the relevant description of S201 above, which will not be repeated here.

S402, when the UE is in an idle state or an inactive state, if the UE determines that first data is to be sent, and that the configuration information of the SDT does not meet a transmission requirement of the first data, the UE sends an RRC establishment request to the base station. Correspondingly, the base station receives the RRC establishment request from the UE.

In the embodiment, when the UE is in the idle state or the inactive state, the UE determines that the first data is to be sent, and that the configuration information of the SDT does not meet the transmission requirement of the first data. For the implementation process, reference can be made to the relevant description of S202 above, which will not be repeated here. Then, the UE sends an RRC establishment request to the base station, where the RRC establishment request is used to request establishment of an RRC connection, that is, the RRC establishment request represents or indicates that there exists first data to be sent at the UE and therefore an RRC connection is needed to be established.

In an implementation, the RRC establishment request includes a request cause for requesting to establish the RRC connection, where the request cause includes a need for priority access to a network (highPriorityAccess) or a preset cause. The preset cause includes: existence of data that needs to be sent preferentially, or non-SDT data that is to be sent.

In an implementation, the RRC establishment request does not include an identifier of the UE.

In an implementation, the RRC establishment request does not include other information than the request cause described above. The RRC establishment request does not need to carry redundant information, which reduces the amount of information in the RRC establishment request and saves the transmission resource for the RRC establishment request.

S403, the base station sends the RRC establishment message to the UE. Correspondingly, the UE receives the RRC establishment message from the base station.

In the embodiment, after the base station receives the RRC establishment request sent by the UE, the base station allows the UE to establish an RRC connection, and then the base station sends an RRC establishment message to the UE.

S404, the UE enters a connected state according to the RRC establishment message.

In the embodiment, the UE receives the RRC establishment message sent by the base station, where the RRC establishment message is used to instruct the UE to establish an RRC connection, and then, the UE establishes the RRC connection according to the RRC establishment message to enter the connected state.

In an implementation, if the UE does not receive the RRC establishment message sent by the base station, the UE considers that the RRC establishment has failed, and then the UE establishes the RRC connection to enter the connected state; or, the UE sends an RRC establishment request to the base station again to request the establishment of the RRC connection.

In an implementation, after the UE sends the RRC establishment request to the base station, the UE starts a timer to start timing, and that the UE does not receive the RRC establishment message sent by the base station refers to that when timing duration is greater than or equal to preset duration, the UE still does not receive the RRC establishment message from the base station.

S405, the UE sends the first data to the base station.

In the embodiment, after the UE successfully establishes the RRC connection and enters the connected state, the UE may send the first data to the base station, and to meet the transmission requirement of the first data.

In the method for controlling data transmission provided by the embodiment, when the UE is in the idle state or inactive state, if the UE determines that the first data is to be sent, and that the configuration information of the SDT does not meet the transmission requirement of the first data, the UE actively sends an RRC establishment request to the base station, where the RRC establishment request is used to request the base station to establish an RRC connection, and the base station allows the UE to establish an RRC connection, for example, the base station sends an RRC establishment message to the UE, to make the UE establish an RRC connection to enter the connected state, and the UE sends the first data in the connected state, to improve the transmission success rate and reliability of the first data.

Figure 5:
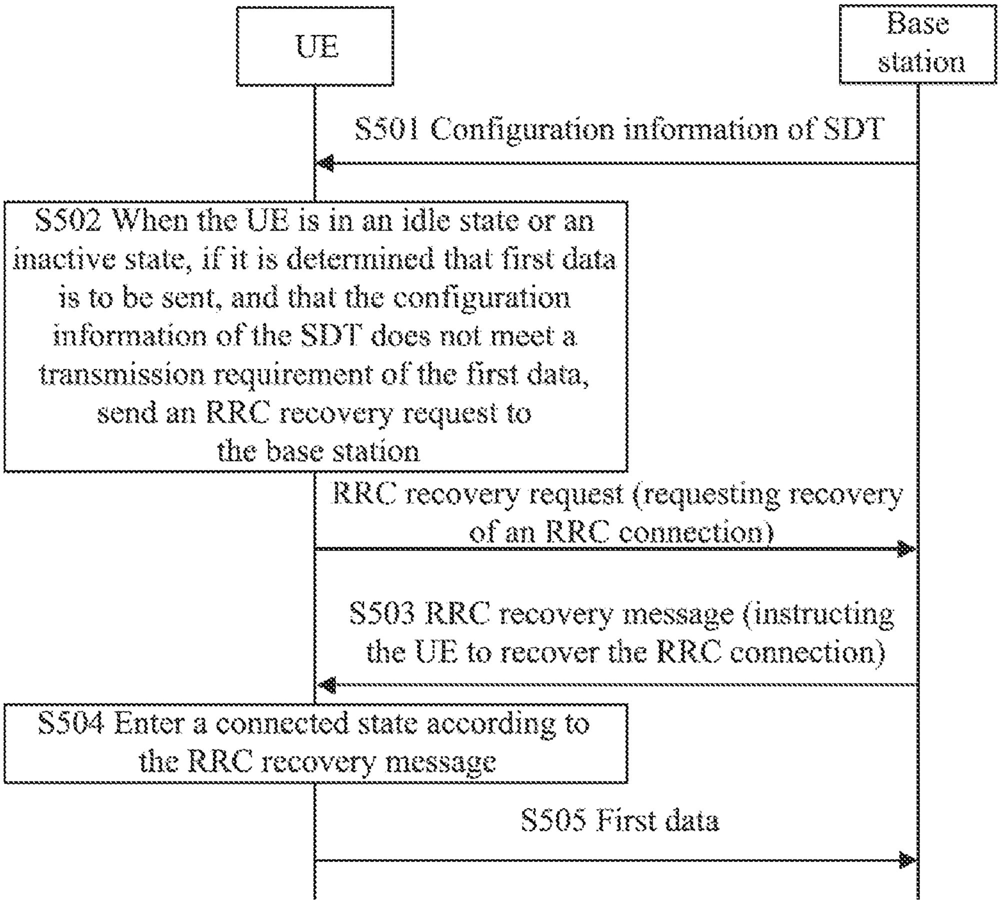
FIG. 5 is a flowchart of a method for controlling data transmission provided by another embodiment of the present application.

FIG. 5 is a flowchart of a method for controlling data transmission provided by another embodiment of the present application. As shown in FIG. 5, first information in the embodiment includes an RRC recovery request, and second information includes an RRC recovery message. The method of the embodiment may include:

S501, a base station sends configuration information of SDT to a UE.

In the embodiment, for the implementation process of S401, reference can be made to the relevant description of S201 above, which will not be repeated here.

S502, when the UE is in an idle state or an inactive state, if the UE determines that first data is to be sent, and that the configuration information of the SDT does not meet a transmission requirement of the first data, the UE sends an RRC recovery request to the base station. Correspondingly, the base station receives the RRC recovery request from the UE.

In the embodiment, when the UE is in the idle state or the inactive state, the UE determines that the first data is to be sent, and that the configuration information of the SDT does not meet the transmission requirement of the first data. For the implementation process, reference can be made to the relevant description of S202 above, which will not be repeated here. Then, the UE sends an RRC recovery request to the base station, where the RRC recovery request is used to request recovery of an RRC connection, that is, the RRC recovery request represents or indicates that there exists first data to be sent at the UE and therefore an RRC connection is needed to be recovered.

In an implementation, the RRC recovery request includes a request cause for requesting to recover the RRC connection, where the request cause includes a need for priority access to a network (highPriorityAccess) or a preset cause. The preset cause includes: existence of data that needs to be sent preferentially, or non-SDT data that is to be sent.

In an implementation, the RRC recovery request does not include an identifier of the UE.

In an implementation, the RRC recovery request does not include other information than the request cause described above. The RRC recovery request does not need to carry redundant information, which reduces the amount of information in the RRC recovery request and saves the transmission resource for the RRC recovery request.

S503, the base station sends the RRC recovery message to the UE. Correspondingly, the UE receives the RRC recovery message from the base station.

In the embodiment, after the base station receives the RRC recovery request sent by the UE, the base station allows the UE to recover the RRC connection, and then the base station sends an RRC recovery message to the UE.

S504, the UE enters a connected state according to the RRC recovery message. In the embodiment, the UE receives the RRC recovery message sent by the base station, where the RRC recovery message is used to instruct the UE to recover the RRC connection, the UE then recovers the RRC connection according to the RRC recovery message to enter the connected state.

In an implementation, if the UE does not receive the RRC establishment message sent by the base station, the UE considers that the RRC establishment has failed, and then the UE establishes an RRC connection to enter the connected state; or, the UE sends an RRC establishment request to the base station again to request the establishment of the RRC connection.

In an implementation, after the UE sends the RRC recovery request to the base station, the UE starts a timer to start timing, and that the UE does not receive the RRC recovery message sent by the base station refers to that when timing duration is greater than or equal to preset duration, the UE still does not received the RRC recovery message from the base station.

S505, the UE sends the first data to the base station.

In the embodiment, after the UE successfully recovers the RRC connection and enters the connected state, the UE may send the first data to the base station, and to meet the transmission requirement of the first data.

In the method for controlling data transmission provided by the embodiment, when the UE is in the idle state or inactive state, if the UE determines that the first data is to be sent, and that the configuration information of the SDT does not meet the transmission requirement of the first data, the UE actively sends an RRC recovery request to the base station, where the RRC recovery request is used to request the base station to recover an RRC connection, and the base station allows the UE to recover an RRC connection, for example, the base station sends an RRC recovery message to the UE, to make the UE recover an RRC connection and enter the connected state, and the UE sends the first data in the connected state, to improve the transmission success rate and reliability of the first data.

Figure 6:
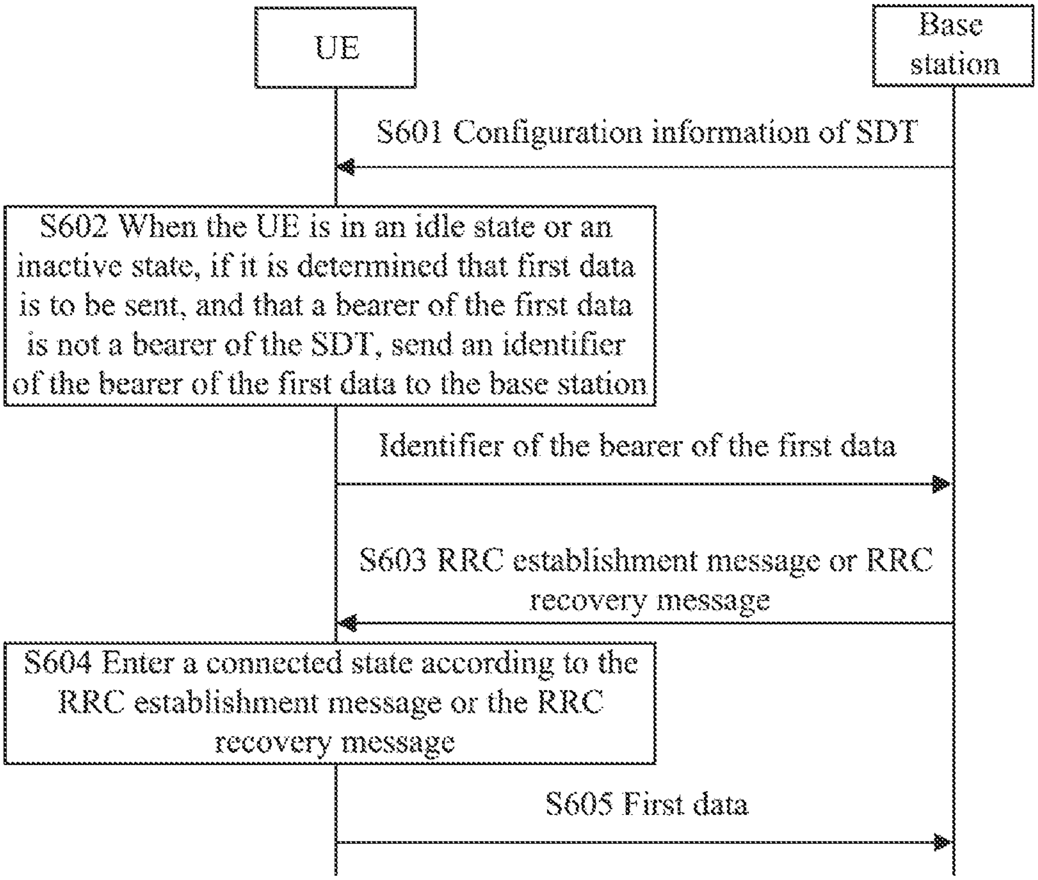
FIG. 6 is a flowchart of a method for controlling data transmission provided by another embodiment of the present application.

FIG. 6 is a flowchart of a method for controlling data transmission provided by another embodiment of the present application. As shown in FIG. 6, first information in the embodiment includes an identifier of a bearer of first data, and second information includes an RRC establishment message or an RRC recovery message. The method of the embodiment may include:

S601, a base station sends configuration information of SDT to a UE.

In the embodiment, for the implementation process of S601, reference can be made to the relevant description of S201 above, which will not be repeated here.

S602, when the UE is in an idle state or an inactive state, if the UE determines that first data is to be sent, and that a bearer of the first data is not a bearer of the SDT, the UE sends an identifier of the bearer of the first data to the base station. Correspondingly, the base station receives the identifier of the bearer of the first data from the UE.

In the embodiment, when the UE is in the idle state or the inactive state, the UE determines that the first data is to be sent, and that the bearer of the first data is not the bearer of the SDT. For the implementation process, reference can be made to the relevant description in the above-mentioned embodiment, which will not be repeated here. It is indicated that the first data is non-SDT data, and then the UE sends the identifier of the bearer of the first data to the base station, where the identifier of the bearer of the first data is used to indicate that there exists at the terminal the first data to be sent the bearer of which corresponds to the identifier, that is, the identifier of the bearer of the first data represents or indicates that there exists first data to be sent at the UE, and therefore the UE needs to enter the connected state.

In an implementation, the identifier of the bearer of the first data may be included in the RRC establishment request or the RRC recovery request to be sent from the UE to the base station.

S603, the base station sends an RRC establishment message or an RRC recovery message to the UE. Correspondingly, the UE receives the RRC establishment message or the RRC recovery message from the base station.

In the embodiment, after the base station receives the identifier of the bearer of the first data sent by the UE, the base station can determine that there exists non-SDT data that needs to be transmitted, and if the base station allows the UE to enter the connected state to carry the first data, the base station sends an RRC establishment message or an RRC recovery message to the UE. For example, if the UE is currently in the idle state, the base station may send an RRC establishment message to the UE, and if the UE is currently in the inactive state, the base station may send an RRC recovery message to the UE.

S604, the UE enters the connected state according to the RRC establishment message or the RRC recovery message.

S605, the UE sends the first data to the base station.

In the embodiment, for the implementation processes of S604 and S605, reference can be made to the relevant descriptions of S304 and S305 above, which will not be repeated here.

In the method for controlling data transmission provided by the embodiment, when the UE is in the idle state or inactive state, if the UE determines that the first data is to be sent, and that the bearer of the first data is not the bearer of the SDT, the UE sends the identifier of the bearer of the first data to the base station, where the identifier of the bearer of the first data is used to inform the base station that there exists non-SDT data to be sent at the UE, and the base station makes relevant decisions, for example, the base station sends an RRC establishment message or an RRC recovery message to the UE, to make the UE enter the connected state, and to send the first data in the connected state, to improve the transmission success rate and reliability of the first data.

Figure 7:
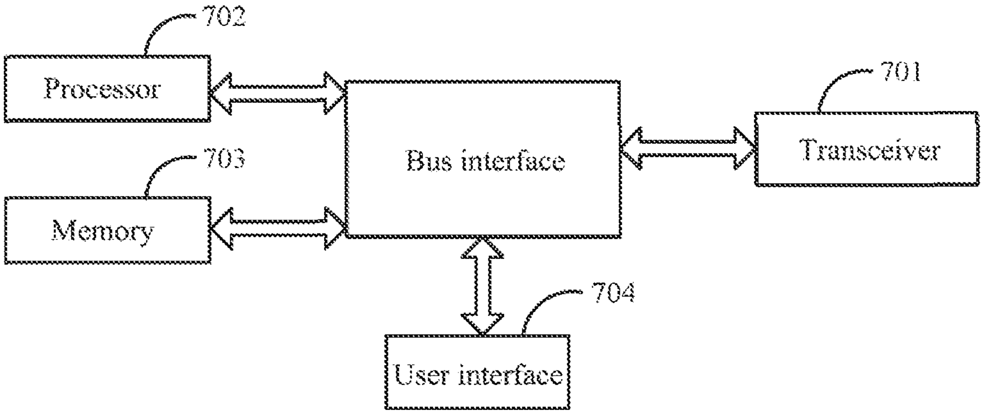
FIG. 7 is a schematic structural diagram of an apparatus for controlling data transmission provided by an embodiment of the present application.

On the terminal side, an embodiment of the present application provides an apparatus for controlling data transmission. As shown in FIG. 7, the apparatus for controlling data transmission of the embodiment may be a terminal, and the apparatus for controlling data transmission may include a transceiver 701, a processor 702 and a memory 703.

The transceiver 701 is configured to receive and send data under control of the processor 702.

In FIG. 7, the bus architecture may include any number of interconnected buses and bridges, and various circuits of one or more processors represented by the processor 702 and one or more memories represented by the memory 703 are linked together. The bus architecture may also link various other circuits together, such as peripherals, voltage regulators, and power management circuits, which are well known in the art and therefore will not be further described herein. The bus interface provides an interface. The transceiver 701 may be elements, that is, including a transmitter and a receiver, providing a unit for communicating with various other apparatuses over transmission media, where the transmission media include transmission media such as a wireless channel, a wired channel, a fiber optic cable, etc. In an implementation, the apparatus for controlling data transmission may also include a user interface 704. For different user devices, the user interface 704 may also be an interface capable of connecting externally and internally to a required device, and the connected device includes but not limited to a keypad, a monitor, a speaker, a microphone, a joystick, and the like.

The processor 702 is responsible for managing the bus architecture and usual processing, and the memory 703 may store data used by the processor 702 when performing operations.

In an implementation, the processor 702 may be a central processing unit (CPU), an application specific integrated circuit (ASIC), a field programmable gate array (FPGA) or a complex programmable logic device (CPLD). The processor may also have a multi-core architecture.

The processor 702 is configured to execute any method related to the terminal provided in the embodiment of the present application according to the obtained executable instruction by calling a computer program stored in the memory 703. The processor and the memory may also be physically separately arranged.

In one embodiment, the processor 702 is configured to perform the following operations:

receiving configuration information of SDT from a network device;

when a terminal is in an idle state or an inactive state, if it is determined that first data is to be sent, and that the configuration information of the SDT does not meet a transmission requirement of the first data, sending first information to the network device, where the first information is used to indicate that there exists the first data to be sent at the terminal.

In an implementation, the processor 702 also performs the following operations:

after the sending the first information to the network device, receiving second information from the network device, where the second information is used to instruct the terminal to enter a connected state; and controlling the terminal to enter the connected state according to the second information.

In an implementation, the determining that the configuration information of the SDT does not meet the transmission requirement of the first data includes:

determining, according to configuration information of a bearer of the SDT, that a bearer of the first information is not the bearer of the SDT; or, determining, according to configuration information of a bearer of the SDT, that a data volume of the first data is greater than or equal to a preset data volume; or, determining, according to configuration information of a bearer of the SDT, that a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the processor 702 also performs the following operations:

before sending the buffer status report to the network device, receiving configuration information of the buffer status report from the network device;

where the sending the buffer status report to the network device includes:

sending the buffer status report to the network device according to the configuration information of the buffer status report.

In an implementation, the configuration information of the SDT further includes logical channel information of the SDT, where the logical channel information of the SDT includes priority of a logical channel of the SDT; and where the sending the buffer status report to the network device includes:

if priority of a logical channel corresponding to the first data is higher than the priority of the logical channel of the SDT, sending the buffer status report to the network device.

In an implementation, sending the buffer status report to the network device includes:

if there is no uplink resource available for sending the buffer status report, initiating random access, and sending the buffer status report to the network device during a random access procedure.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause;

the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processor 702 also performs the following operations:

if the second information is not received from the network device, controlling the terminal to enter the connected state, or sending the first information again.

In an implementation, the processor 702 also performs the following operations:

after sending the first information to the network device, starting timing;

where that the second information is not received from the network device includes:

when timing duration is greater than or equal to preset duration, the second information is still not received from the network device.

In an implementation, the processor 702 also performs the following operations:

if the second information is not received from the network device, determining that SDT transmission fails, or that RRC connection establishment fails, or that RRC connection recovery fails.

In an implementation, before the terminal enters the connected state, the first data is not allowed to be multiplexed on an uplink resource of the SDT, where the configuration information of the SDT further includes uplink resource information of the SDT.

It should be noted herein that, the above apparatus provided in the present application is capable of implementing all the method steps implemented by the terminal in the above method embodiments, and is capable of achieving the same effect, and the same parts and beneficial effects of the present embodiment as those in the method embodiments will not be described in detail herein.

Figure 8:
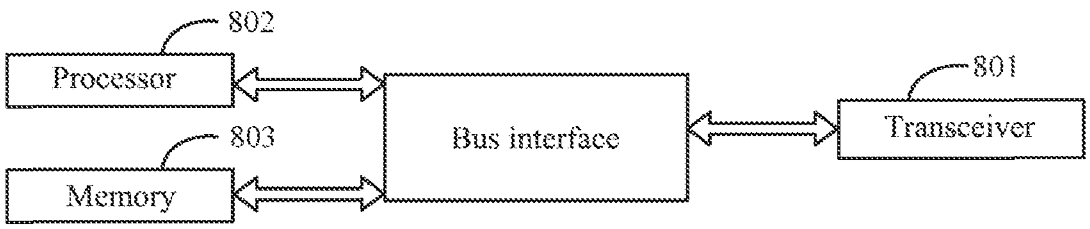
FIG. 8 is a schematic structural diagram of an apparatus for controlling data transmission provided by another embodiment of the present application.

On the network side, an embodiment of the present application provides an apparatus for controlling data transmission. As shown in FIG. 8, the apparatus for controlling data transmission of the embodiment may be a network device, and the apparatus for controlling data transmission may include: a transceiver 801, a processor 802 and a memory 803.

The transceiver 801 is configured to receive and send data under control of the processor 802.

In FIG. 8, the bus architecture may include any number of interconnected buses and bridges, and various circuits of one or more processors represented by the processor 802 and one or more memories represented by the memory 803 are linked together. The bus architecture may also link together various other circuits such as peripherals, voltage regulators, and power management circuits, which are well known in the art and therefore will not be further described herein. The bus interface provides an interface. The transceiver 801 may be elements, that is, including a transmitter and a receiver, and provides a unit for communicating with various other apparatuses over a transmission medium, which includes a transmission medium such as a wireless channel, a wired channel, a fiber optic cable, etc. The processor 802 is responsible for managing the bus architecture and usual processing, and the memory 803 may store data used by the processor 802 when performing operations.

The processor 802 may be a CPU, an ASIC, a FPGA or a CPLD. The processor may also have a multi-core architecture.

The processor 802 is configured to execute any method related to the network device provided in the embodiments of the present application according to the obtained executable instruction by calling a computer program stored in the memory 803. The processor and the memory may also be physically separately arranged.

In one embodiment, the processor 802 is configured to perform the following operations:

sending configuration information of SDT to a terminal; and when the terminal is in an idle state or an inactive state, receiving first information which is sent by the terminal when the terminal determines that first data is to be sent and that the configuration information of the SDT does not meet a transmission requirement of the first data, where the first information is used to indicate that there exists the first data to be sent at the terminal.

In an implementation, the processor 802 also performs the following operations:

after receiving the first information from the terminal, sending second information to the terminal, where the second information is used to instruct the terminal to enter a connected state.

In an implementation, that the configuration information of the SDT does not meet the transmission requirement for the first data includes:

a bearer of the first information is not a bearer of the SDT; or, a data volume of the first data is greater than or equal to a preset data volume; or, a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the processor 802 also performs the following operations:

before receiving the buffer status report from the terminal, sending configuration information of the buffer status report to the terminal;

where the receiving the buffer status report from the terminal includes:

receiving the buffer status report from the terminal according to the configuration information of the buffer status report.

In an implementation, the configuration information of the SDT further includes logical channel information of the SDT, where the logical channel information of the SDT includes priority of a logical channel of the SDT; and where receiving the buffer status report from the terminal includes:

if priority of a logical channel corresponding to the first data is higher than the priority of the logical channel of the SDT, receiving the buffer status report from the terminal.

In an implementation, receiving the buffer status report from the terminal includes:

if there is no uplink resource available for sending the buffer status report, receiving the buffer status report from the terminal during a random access procedure initiated by the terminal.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processor 802 also performs the following operations:

if the second information is not sent to the terminal, receiving the first information from the terminal again.

It should be noted herein that, the above apparatus provided in the present application is capable of implementing all the method steps implemented by the network device in the above method embodiments, and is capable of achieving the same effect, and the same parts and beneficial effects of the present embodiment as those in the method embodiment will not be described in detail herein.

Figure 9:
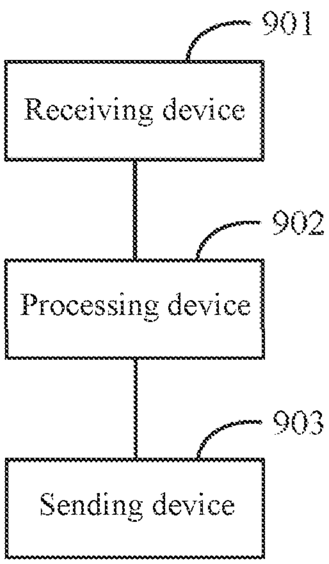
FIG. 9 is a schematic structural diagram of an apparatus for controlling data transmission provided by another embodiment of the present application.

On the terminal side, an embodiment of the present application provides an apparatus for controlling data transmission. As shown in FIG. 9, the apparatus for controlling data transmission of the embodiment may be a terminal, and the apparatus for controlling data transmission includes a receiving device 901, a processing device 902 and a sending device 903.

The receiving device 901 is configured to receive configuration information of SDT from a network device.

The processing device 902 is configured to determine whether the first data is to be sent, and that the configuration information of the SDT does not meet a transmission requirement of the first data.

The sending device 903 is configured to, when the terminal is in an idle state or an inactive state, if the processing device determines that first data is to be sent and that the configuration information of the SDT does not meet the transmission requirement of the first data, send first information to the network device, where the first information is used to indicate that there exists the first data to be sent at the terminal.

In an implementation, the receiving device 901 is further configured to, after the sending device 903 sends the first information to the network device, receive second information from the network device, where the second information is used to instruct the terminal to enter a connected state; and the processing device 902 is further configured to control the terminal to enter the connected state according to the second information.

In an implementation, the determining that the configuration information of the SDT does not meet the transmission requirement of the first data includes:

determining, according to configuration information of a bearer of the SDT, that a bearer of the first information is not the bearer of the SDT; or, determining, according to configuration information of a bearer of the SDT, that a data volume of the first data is greater than or equal to a preset data volume; or, determining, according to configuration information of a bearer of the SDT, that a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the receiving device 901 is further configured to, before the sending device 903 sends the buffer status report to the network device, receive configuration information of the buffer status report from the network device;

where the sending the buffer status report to the network device includes:

sending the buffer status report to the network device according to the configuration information of the buffer status report.

In an implementation, the configuration information of the SDT further includes logical channel information of the SDT, where the logical channel information of the SDT includes priority of a logical channel of the SDT; and where sending the buffer status report to the network device includes:

when priority of a logical channel corresponding to the first data is higher than the priority of the logical channel of the SDT, sending the buffer status report to the network device.

In an implementation, sending the buffer status report to the network device includes:

if there is no uplink resource available for sending the buffer status report, initiating random access, and sending the buffer status report to the network device during a random access procedure.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause; and the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the processing device 902 is further configured to, if the receiving device 901 does not receive the second information from the network device, enter the connected state; or, the sending device 903 is further configured to send the first information again if the receiving device 901 does not receive the second information from the network device.

In an implementation, the processing device 902 is further configured to, after sending the first information to the network device, start timing;

where that the second information is not received from the network device includes:

when timing duration is greater than or equal to preset duration, the second information is still not received from the network device.

In an implementation, the processing device 902 is further configured to, if the receiving device 901 does not receive the second information from the network device, determine that SDT transmission fails, or that RRC connection establishment fails, or that RRC connection recovery fails.

In an implementation, before the terminal enters the connected state, the first data is not allowed to be multiplexed on an uplink resource of the SDT, where the configuration information of the SDT further includes uplink resource information of the SDT.

It should be noted herein that, the above apparatus provided in the present application is capable of implementing all the method steps implemented by the terminal in the above method embodiments, and is capable of achieving the same effect, and the same parts and beneficial effects of the present embodiment as those in the method embodiment will not be described in detail herein.

Figure 10:
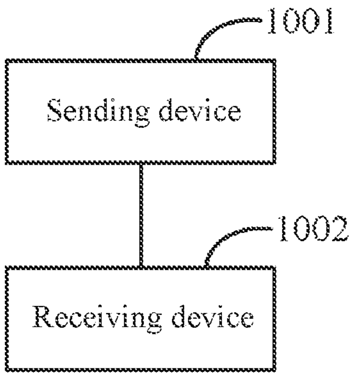
FIG. 10 is a schematic structural diagram of an apparatus for controlling data transmission provided by another embodiment of the present application.

On the network side, an embodiment of the present application further provides an apparatus for controlling data transmission. As shown in FIG. 10, the apparatus for controlling data transmission of the embodiment may be a network device, and the apparatus for controlling data transmission includes: a sending device 1001 and a receiving device 1002.

The sending device 1001 is configured to send configuration information of SDT to a terminal.

The receiving device 1002 is configured to, when the terminal is in an idle state or an inactive state, receive first information which is sent by the terminal when the terminal determines that first data is to be sent and that the configuration information of the SDT does not meet a transmission requirement of the first data, where the first information is used to indicate that there exists the first data to be sent at the terminal.

In an implementation, the sending device 1001 is further configured to, after the receiving device 1002 receives the first information from the terminal, send second information to the terminal, where the second information is used to instruct the terminal to enter a connected state.

In an implementation, that the configuration information of the SDT does not meet the transmission requirement of the first data includes:

a bearer of the first information is not a bearer of the SDT; or, a data volume of the first data is greater than or equal to a preset data volume; or, a number of packets of the first data is greater than or equal to a preset number.

In an implementation, the configuration information of the SDT further includes one or more of the following: configuration information of the bearer of the SDT, the preset data volume, or the preset number.

In an implementation, the first information includes:

a buffer status report, where the buffer status report is used to indicate a data volume of the first data to be sent; or, an RRC establishment request, where the RRC establishment request is used to request establishment of an RRC connection; or, an RRC recovery request, where the RRC recovery request is used to request recovery of an RRC connection; or, an identifier of the bearer of the first data.

In an implementation, the sending device 1001 is further configured to, before the receiving device 1002 receives the buffer status report from the terminal, send configuration information of the buffer status report to the terminal;

where the receiving the buffer status report from the terminal includes:

receiving the buffer status report from the terminal according to the configuration information of the buffer status report.

In an implementation, the configuration information of the SDT further includes logical channel information of the SDT, where the logical channel information of the SDT includes priority of a logical channel of the SDT; and where receiving the buffer status report from the terminal includes:

if priority of a logical channel corresponding to the first data is higher than the priority of the logical channel of the SDT, receiving the buffer status report from the terminal.

In an implementation, receiving the buffer status report from the terminal includes:

if there is no uplink resource available for sending the buffer status report, receiving the buffer status report from the terminal during a random access procedure initiated by the terminal.

In an implementation, the buffer status report is included in a Msg3 or MSGA message in the random access procedure.

In an implementation, the RRC establishment request or the RRC recovery request includes a request cause, where the request cause includes a need for priority access to a network or a preset cause;

the preset cause includes: existence of data that needs to be sent preferentially, or non-SDT data that is to be sent.

In an implementation, the second information includes:

an RRC establishment message, where the RRC establishment message is used to instruct the terminal to establish an RRC connection; or, an RRC recovery message, where the RRC recovery message is used to instruct the terminal to recover an RRC connection.

In an implementation, the receiving device 1002 is further configured to, if the sending device 1001 does not send the second information to the terminal, receive the first information from the terminal again.

It should be noted herein that, the above apparatus provided in the present application is capable of implementing all the method steps implemented by the network device in the above method embodiment, and is capable of achieving the same effect, and the same parts and beneficial effects of the present embodiment as those in the method embodiment will not be described in detail herein.

It should be noted that, the division of devices in the embodiments of the present application is illustrative, and is only a logical function division, and there may be other division manners in actual implementation. In addition, each functional device in each embodiment of the present application may be integrated in a single processing device, or each device may be physically present separately, or two or more devices may be integrated in a single device. The above integrated devices may be implemented either in the form of hardware or in the form of software functional devices.

The integrated devices may be stored in a processor-readable storage medium when implemented in the form of software function devices and sold or used as an independent product. Based on this understanding, the embodiments of the present application is essentially, or the part which makes contribution to the prior art, or all or part of the solution can be embodied in the form of a software product. The computer software product may be stored in a storage medium, including several instructions for enabling a computer device (which may be a personal computer, a server, or a network device, etc.) or a processor to execute all or part of the steps of the methods in the various embodiments of the present application. The aforementioned storage medium includes: a U disk, a mobile hard disk, a read-only memory (ROM), a random access memory (RAM), a magnetic disk or an optical disk and other medium that can store program codes.

On the terminal side, an embodiment of the present application provides a processor-readable storage medium, where the processor-readable storage medium has a computer program stored thereon, and the computer program is used to cause a processor to execute any method related to the terminal provided in the embodiments of the present application. The processor is enabled to implement all the method steps implemented by the terminal in the above method embodiments, and to achieve the same effect, and the same parts and beneficial effects of the present embodiment as those in the method embodiment will not be described in detail herein.

On the network side, an embodiment of the present application provides a processor-readable storage medium, where the processor-readable storage medium has a computer program stored thereon, and the computer program is used to cause a processor to execute any method related to the network device provided in the embodiments of the present application. The processor is enabled to implement all the method steps implemented by the network device in the above method embodiments, and to achieve the same effect, and the same parts and beneficial effects of the present embodiment as those in the method embodiment will not be described in detail herein.

The processor-readable storage medium may be any available medium or data storage device that can be accessed by a processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as ROM, EPROM, EEPROM, a non-volatile memory (NAND FLASH), a solid state disk (SSD)), etc.

Embodiments of the present application may be provided as methods, systems, or computer program products. Accordingly, the present application may take the form of an entirely hardware embodiment, an entirely software embodiment or an embodiment combining software and hardware aspects. The present application may take the form of a computer program product embodied on one or more computer-usable storage mediums (including but not limited to a disk storage and an optical storage, etc.) having computer-usable program code stored thereon.

The present application is described with reference to flowcharts and/or block diagrams of methods, apparatuses, and computer program products according to embodiments of the present application. It should be understood that each procedure and/or block in the flowcharts and/or block diagrams, and combinations of procedures and/or blocks in the flowcharts and/or block diagrams may be implemented by the computer-executable instructions. These computer-executable instructions may be provided to a processor of a general-purpose computer, a specialized computer, an embedded processor, or other programmable data processor to produce a machine, and an apparatus for implementing a function specified in one or more processes of the flowcharts and/or one or more blocks of the block diagrams may be produced via the instructions executed by the processor of the computer or other programmable data processor.

These processor-executable instructions may also be stored in a processor-readable memory capable of directing a computer or other programmable data processors to operate in a specific manner, and the instructions stored in the processor-readable memory produce a manufacturing product including an instruction apparatus, where the instruction apparatus realizes the function specified in one or more processes of the flow charts and/or one or more blocks of the block diagram.

These processor-executable instructions may also be loaded onto a computer or other programmable data processing device, and a series of operational steps are performed on the computer or other programmable device to produce computer-implemented processing. Therefore, the instructions executed on the computer or other programmable device provide steps for implementing the functions specified in one or more processes of the flowcharts and/or one or more blocks of the block diagrams.

The invention claimed is:

1. A method for controlling data transmission, comprising:

receiving, by a terminal, configuration information of small data transmission (SDT) from a network device, wherein the configuration information of the SDT comprises configuration information of a bearer of the SDT; and when the terminal is in an idle state or an inactive state, and when the terminal determines that first data is to be sent, and determines that the configuration information of the SDT does not meet a transmission requirement of the first data, then sending, by the terminal, first information to the network device, wherein the first information indicates that there exists the first data to be sent at the terminal and a bearer of the first data is not the bearer of the SDT;

wherein the determining, by the terminal, that the configuration information of the SDT does not meet the transmission requirement of the first data comprises:

determining, by the terminal, according to the configuration information of the bearer of the SDT, that the bearer of the first data is not the bearer of the SDT;

wherein the configuration information of the bearer of the SDT comprises an identifier of the bearer of the SDT, and the determining, by the terminal, according to the configuration information of the bearer of the SDT, that the bearer of the first data is not the bearer of the SDT comprises:

determining, by the terminal, according to the identifier of the bearer of the SDT, whether an identifier of the bearer of the first data is the same as the identifier of the bearer of the SDT, and when the identifier of the bearer of the first data is different from the identifier of the bearer of the SDT, determining that the bearer of the first data is not the bearer of the SDT.

2. The method according to claim 1, wherein after the sending, by the terminal, the first information to the network device, the method further comprises:

receiving, by the terminal, second information from the network device, wherein the second information is used to instruct the terminal to enter a connected state; and entering, by the terminal, the connected state according to the second information.

3. The method according to claim 2, wherein the second information comprises:

an RRC establishment message, wherein the RRC establishment message is used to instruct the terminal to establish an RRC connection; or, an RRC recovery message, wherein the RRC recovery message is used to instruct the terminal to recover an RRC connection.

4. The method according to claim 2, further comprising:

after the sending, by the terminal, the first information to the network device, starting timing; and detecting that timing duration is greater than or equal to preset duration and the terminal still does not receive the second information from the network device, entering, by the terminal, the connected state, or sending, by the terminal, the first information again.

5. The method according to claim 2, further comprising:

detecting that the terminal does not receive the second information from the network device, determining, by the terminal, that SDT transmission fails, or that RRC connection establishment fails, or that RRC connection recovery fails.

6. The method according to claim 2, wherein before the terminal enters the connected state, the first data is not allowed to be multiplexed on an uplink resource of the SDT, wherein the configuration information of the SDT further comprises uplink resource information of the SDT.

7. The method according to claim 1, wherein the first information comprises:

a buffer status report, wherein the buffer status report is used to indicate a data volume of the first data to be sent; or, a radio resource control (RRC) establishment request, wherein the RRC establishment request is used to request establishment of an RRC connection; or, an RRC recovery request, wherein the RRC recovery request is used to request recovery of an RRC connection; or, an identifier of the bearer of the first data.

8. The method according to claim 7, wherein before sending, by the terminal, the buffer status report to the network device, the method further comprises:

receiving, by the terminal, configuration information of the buffer status report from the network device;

wherein the sending, by the terminal, the buffer status report to the network device comprises:

sending, by the terminal, the buffer status report to the network device according to the configuration information of the buffer status report.

9. The method according to claim 7, wherein the configuration information of the SDT further comprises logical channel information of the SDT, wherein the logical channel information of the SDT comprises priority of a logical channel of the SDT; and sending, by the terminal, the buffer status report to the network device comprises:

detecting that priority of a logical channel corresponding to the first data is higher than the priority of the logical channel of the SDT, sending, by the terminal, the buffer status report to the network device.

10. The method according to claim 7, wherein sending, by the terminal, the buffer status report to the network device comprises:

detecting that there is no uplink resource available for sending the buffer status report, initiating, by the terminal, random access, and sending the buffer status report to the network device during a random access procedure;

wherein the buffer status report is comprised in a Msg3 or MSGA message in the random access procedure.

11. The method according to claim 7, wherein the RRC establishment request or the RRC recovery request comprises a request cause, wherein the request cause comprises a need for priority access to a network or a preset cause; and the preset cause comprises: existence of data that needs to be sent preferentially, or non-SDT data that is to be sent.

12. A non-transitory processor-readable storage medium, wherein the processor-readable storage medium has a computer program stored thereon, and the computer program is used to cause a processor to execute the method according to claim 1.

13. A method for controlling data transmission, comprising:

sending, by a network device, configuration information of small data transmission (SDT) to a terminal, wherein the configuration information of the SDT comprises configuration information of a bearer of the SDT; and when the terminal is in an idle state or an inactive state, receiving first information which is sent by the terminal when the terminal determines that first data is to be sent and that the configuration information of the SDT does not meet a transmission requirement of the first data, wherein the first information indicates that there exists the first data to be sent at the terminal and a bearer of the first data is not the bearer of the SDT;

wherein the terminal determines that the configuration information of the SDT does not meet the transmission requirement of the first data comprises:

the bearer of the first data is not the bearer of the SDT;

wherein the configuration information of the bearer of the SDT comprises an identifier of the bearer of the SDT, and the bearer of the first data is not the bearer of the SDT comprises:

an identifier of the bearer of the first data is different from the identifier of the bearer of the SDT.

14. The method according to claim 13, wherein after receiving, by the network device, the first information from the terminal, the method further comprises:

sending, by the network device, second information to the terminal, wherein the second information is used to instruct the terminal to enter a connected state.

15. An apparatus for controlling data transmission, comprising a memory, a transceiver and a processor:

wherein the memory is configured to store a computer program;

the transceiver is configured to send and receive data under control of the processor;

the processor is configured to read the computer program in the memory and execute the method according to claim 13.

16. An apparatus for controlling data transmission, comprising a memory, a transceiver and a processor:

wherein the memory is configured to store a computer program;

the transceiver is configured to send and receive data under control of the processor;

the processor is configured to read the computer program in the memory and execute the following operations:

receiving configuration information of small data transmission (SDT) from a network device, wherein the configuration information of the SDT comprises configuration information of a bearer of the SDT;

when a terminal is in an idle state or an inactive state, and when the terminal determines that first data is to be sent, and determines that the configuration information of the SDT does not meet a transmission requirement of the first data, then sending first information to the network device, wherein the first information indicates that there exists the first data to be sent at the terminal and a bearer of the first data is not the bearer of the SDT;

wherein the determining that the configuration information of the SDT does not meet the transmission requirement of the first data comprises:

determining that the bearer of the first data is not the bearer of the SDT according to the configuration information of the bearer of the SDT;

wherein the configuration information of the bearer of the SDT comprises an identifier of the bearer of the SDT, and the determining that the bearer of the first data is not the bearer of the SDT according to the configuration information of the bearer of the SDT comprises:

determining, according to the identifier of the bearer of the SDT, whether an identifier of the bearer of the first data is the same as the identifier of the bearer of the SDT, and when the identifier of the bearer of the first data is different from the identifier of the bearer of the SDT, determining that the bearer of the first data is not the bearer of the SDT.

* * * * *